US008151735B1

(12) United States Patent
McCrocklin

(10) Patent No.: US 8,151,735 B1
(45) Date of Patent: Apr. 10, 2012

(54) LEASH

(75) Inventor: Amber McCrocklin, Tampa, FL (US)

(73) Assignee: Paws Aboard, LLC

( * ) Notice: Subject to any disclaimer, the term of this patent is extended or adjusted under 35 U.S.C. 154(b) by 0 days.

(21) Appl. No.: 12/931,785

(22) Filed: Feb. 10, 2011

Related U.S. Application Data

(60) Provisional application No. 61/337,633, filed on Feb. 10, 2010.

(51) Int. Cl.
*A01K 27/00* (2006.01)
*B65H 75/34* (2006.01)

(52) U.S. Cl. .................................................. 119/796

(58) Field of Classification Search ............. 119/794, 119/795, 796; 242/388, 388.6, 388.7
See application file for complete search history.

(56) References Cited

U.S. PATENT DOCUMENTS

| 2,314,504 A | 3/1943 | Lifchultz |
| 3,198,175 A | 8/1965 | Dean |
| 3,250,253 A | 5/1966 | Galin |
| 3,477,410 A | 11/1969 | Lettieri |
| 3,693,596 A | 9/1972 | Croce et al. |
| 3,776,198 A | 12/1973 | Gehrke |
| 3,853,283 A | 12/1974 | Croce et al. |
| 4,018,189 A | 4/1977 | Umphries et al. |
| 4,165,713 A | 8/1979 | Brawner et al. |
| 4,328,766 A | 5/1982 | Deibert |
| 4,328,767 A | 5/1982 | Peterson |
| 4,501,230 A | 2/1985 | Talo |
| 4,887,551 A | 12/1989 | Musetti |
| 4,964,370 A | 10/1990 | Peterson |
| 5,377,626 A | 1/1995 | Kirby et al. |
| 5,483,926 A | 1/1996 | Bogdahn |
| 5,595,143 A | 1/1997 | Alberti |
| 5,890,456 A | 4/1999 | Tancrede |
| 6,003,472 A | 12/1999 | Matt et al. |
| 6,024,054 A | 2/2000 | Matt et al. |
| 6,148,773 A | 11/2000 | Bogdahn |
| 6,474,270 B1 | 11/2002 | Imes |
| 6,526,918 B1 | 3/2003 | Arnold |
| 6,648,261 B2 | 11/2003 | Irving |
| 6,712,026 B1 | 3/2004 | Carville, Jr. |
| 6,792,893 B1 | 9/2004 | Quintero et al. |
| 6,845,736 B1 | 1/2005 | Anderson |
| 6,886,499 B2 | 5/2005 | Meissner |
| 6,904,872 B2 | 6/2005 | Muller |
| 6,912,975 B1 | 7/2005 | Balan |
| 7,017,527 B2 | 3/2006 | Price |
| 7,036,459 B1 | 5/2006 | Mugford et al. |
| 7,040,257 B2 | 5/2006 | Waxman et al. |
| 7,131,401 B2 | 11/2006 | Huff et al. |

(Continued)

*Primary Examiner* — Monica Williams
(74) *Attorney, Agent, or Firm* — Frijouf, Rust & Pyle, P.A.

(57) ABSTRACT

A leash is disclosed for coupling a first animal and a second animal to an object. The leash comprises an exterior bulbous body and an interior bulbous body. A first tether spool and a second tether spool rotatably engage within the interior bulbous body. A first tether coils about the first tether spool and a second tether coils about the second tether spool. The interior bulbous body is positioned within the exterior bulbous body. A sleeve is interposed between the interior bulbous body and the exterior bulbous body for rotatably engaging the interior bulbous body relative to the exterior bulbous body. A first conduit and a second conduit traverse the interior bulbous body and the exterior bulbous body for receiving the first tether and second tether respectively and coupling with the animals. A rotation of the interior bulbous body occurs upon a traversing of the first tether relative to the second tether and prevents the first tether entangling with the second tether.

11 Claims, 12 Drawing Sheets

U.S. PATENT DOCUMENTS

| | | |
|---|---|---|
| 7,168,393 B2 | 1/2007 | Bogdahn et al. |
| 7,207,296 B2 | 4/2007 | DiDonato |
| 7,325,515 B2 | 2/2008 | Hetland |
| 7,455,034 B2 | 11/2008 | DiDonato |
| 2003/0042350 A1 | 3/2003 | Irving |
| 2003/0145803 A1 | 8/2003 | Muller |
| 2004/0154556 A1 | 8/2004 | Masterson et al. |
| 2004/0237906 A1 | 12/2004 | Waxman et al. |
| 2004/0237907 A1 | 12/2004 | Muller |
| 2005/0011472 A1 | 1/2005 | Wuensche |
| 2005/0103282 A1 | 5/2005 | Huff |
| 2005/0211189 A1 | 9/2005 | Price |
| 2005/0263103 A1 | 12/2005 | Updyke et al. |
| 2006/0144343 A1 | 7/2006 | Price |
| 2006/0236956 A1 | 10/2006 | Lord |
| 2007/0022975 A1 | 2/2007 | Arnold |
| 2007/0039560 A1 | 2/2007 | Smith |
| 2007/0131177 A1 | 6/2007 | Perkitny |
| 2007/0204806 A1 | 9/2007 | Hurwitz |
| 2008/0000433 A1 | 1/2008 | DiDonato |
| 2008/0017134 A1 | 1/2008 | Robley |
| 2009/0178627 A1 | 7/2009 | Bentz |

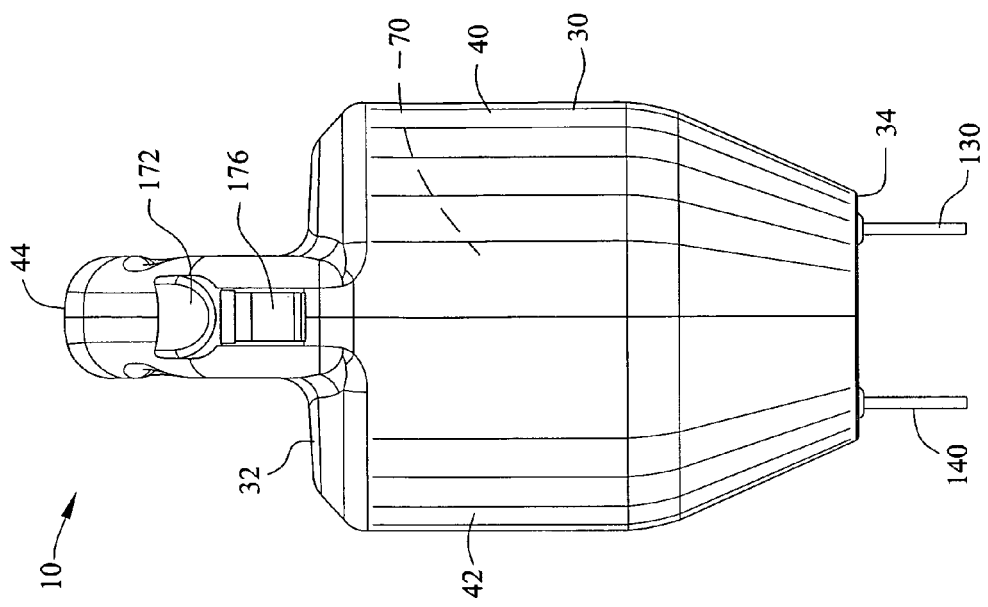
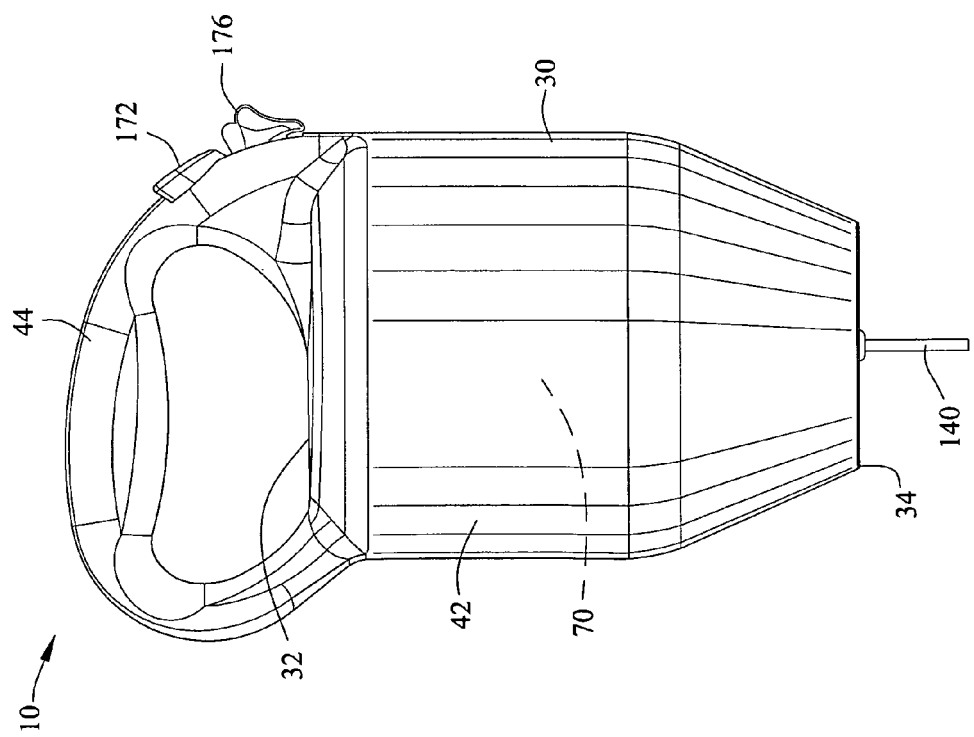

LEASH

CROSS-REFERENCE TO RELATED APPLICATIONS

This application claims benefit of U.S. Patent Provisional application Ser. No. 61/337,633 filed Feb. 10, 2010. All subject matter set forth in provisional application Ser. No. 61/337,633 is hereby incorporated by reference into the present application as if fully set forth herein.

BACKGROUND OF THE INVENTION

1. Field of the Invention

This invention relates to animal control devices and more particularly to an animal leash device for preventing entanglement of a first tether and a second tether.

2. Background of the Invention

Ever since man became associated with dogs, the use of a leash was employed as a method to control the animal. Ancient art from 4400 B.C. illustrates dogs wearing collars and under their master's control via leashes. Dogs were originally used in hunting and for the protection of people. These activities are still used today, but have been joined by today's most popular use, having a dog as a companion. Today, companion dogs of every size and breed can now be seen accompanying their masters on streets throughout the world. The popularity of companion dogs as pets has resulted in leash laws, wherein the owner/master of the dog is required to keep his/her dog on a leash in an effort to ensure the owner's control of the animal. The evolution in the development of leashes has progressed from a simple length of leather to sophisticated systems utilizing a handle and telescoping line on a reel, permitting greater flexibility in controlling the animal.

In recent years there has been an increase of persons walking with more than one dog. Invariably, when walking more than one dog, the dogs will exchange positions, resulting in a twisting of their leashes. As the leashes are twisted, the telescoping and retrieval of the leash lines are compromised, resulting in diminished control over the animals.

There have been many in the prior art who have attempted to solve these problems with varying degrees of success. None, however completely satisfies the requirements for a complete solution to the aforestated problem. The following U.S. patents are attempts of the prior art to solve this problem.

U.S. Pat. No. 2,314,504 to Lifchultz discloses the control of dogs and other similar animals, and includes among its objects and advantages the provision of an improved leash constructed and arranged to enable the user to employ his full strength, if need be, in controlling the animal without discomfort, and at the same time to call for a minimum of constraint or manipulation of the leash at times when maximum effort is not called for.

U.S. Pat. No. 3,198,175 to Dean discloses a dog leash which is such in construction that it can be acceptably and effectively used with minimal effort on the part of the dog handler without discomforting the dog. Like certain analogous prior art adaptations, it is characterized by a spring-loaded reel-wound leash which, while it is normally attached to and left in position on the dog's collar, can be detached whenever necessary or desired.

U.S. Pat. No. 3,250,253 to Galin discloses improvements in leashes for domestic animals and more particularly to an improved form of retractable leash for use with animal collars. A retractable leash for use with a domestic animal, such as a dog, is useful for calming the animal in crowded or congested areas, for example, city streets and public conveyances. The noise, motion, and people commonly encountered in such places generally cause even well-trained and good-tempered animals to be nervous and uncontrollable. By providing a leash which can be quickly and conveniently shortened, the distance between the animal and the master can be readily decreased so the well-known calming influence exerted on the animal by the close proximity of the master can be exercised. This is of particular importance when the master's hands are otherwise occupied with parcels and the like, or when the master is blind.

U.S. Pat. No. 3,693,596 to Croce, et al. discloses a reel type spring wound extendible animal leash controlled by cam and gears under manual setting of a select lever to have four different positions: locked leash; free movement of leash; leash restrained to be payed but not to be wound up; and leash restrained to be wound up but not unwound.

U.S. Pat. No. 3,853,283 to Croce, et al. discloses a retractable leash device in which the rotation of a spring-return leash carrying reel is controlled by positioning a cam that established the respective settings of a pair of pawls, both of which cooperate with a single toothed wheel connected to the reel, such that in accordance with the cam position selected, the leash can be freely paid out and retracted by the spring, or locked against further pay-out but freely retracted by the spring upon slackening, or locked against both pay-out and retraction.

U.S. Pat. No. 4,018,189 to Umphries, et al. discloses a retractable leash for dogs and other pets. A casing is fastened to a dog collar and remains connected thereto during periods when the animal is not being walked. A rotatable reel is supported in the casing and a flexible leash is wound about the reel. One end of the leash is externally accessible of the casing by connection to a handle. A spring engages both the reel and the casing and tightly coils in response to the unwinding of the leash. A removable cover on one side of the casing facilitates servicing, the cover being locked closed by the attachment to the animal's collar.

U.S. Pat. No. 4,165,713 to Brawner, et al. discloses a retractable leash for dogs and like pets including a housing having a generally cylindrical cavity in which a rotatable reel is mounted and spring biased in one direction with a flexible leash member wound on the reel and extending externally of the housing and connected to a handle. The handle is defined by a resilient loop which encircles and resiliently biases into engagement with the housing for providing a compact arrangement when the leash is not in use.

U.S. Pat. No. 4,501,230 to Talo discloses a hand-held apparatus which dispenses, retracts and locks an animal leash in a desired position characterized by a spool housing sized to store a length of cord and a handle portion adapted to be grasped in the hand of a user. The spool housing rotably mounts a spool having the length of cord wrapped thereabout with the distal end of the cord being attachable to an animal collar. A coil spring is mounted between the spool and spool housing to continuously bias the length of cord in a retracted position about the spool. A high strength locking mechanism adapted to selectively apply friction to the spool and positively prevent the cord from being dispensed or retracted from the spool is provided which is actuable by way of a trigger lever formed on the handle portion of the housing. A cam actuator stop is additionally provided to maintain the locking mechanism in a locked orientation.

U.S. Pat. No. 5,377,626 to Kilsby, et al. discloses a lunge line controller which can be easily and conveniently operated by one hand for lunging a horse for training or exercising purposes while avoiding injury to the operator or the animal.

The controller includes a housing in which a reel is disposed and pivoted on a shaft. The reel includes a cylindrical central hub containing a spring. The reel has planar circular flanges that project outwardly from both outer surfaces and includes evenly spaced teeth on the outside of the flanges. The spring connects to the shaft to urge the reel in one direction of rotation. A flexible tape is connected to the reel and extends out of the housing and has a clip at its free end. When in a release position, the spring rotates the reel, thus coiling the tape around the reel until the clip reaches the housing. The latching means comprises an actuation and locking button biased by a spring to an outward position. The button comprises two rectangular portions, i.e., a back rectangular portion which extends to a transverse rectangular portion. The back rectangular portion extends out of the housing and includes an angled outer end. The back rectangular portion also includes a locking notch on its underside that can be hooked onto the housing to hold the button in position. The transverse rectangular portion of the button includes two projecting fingers that provide interference with the teeth on the reel. This configuration allows the operator to select three separate functions by pushing the button, i.e., the tape can either be (1) freely paid-out and retracted, (2) locked against pay-out or retraction, or (3) momentarily-locked against pay-out or retraction.

U.S. Pat. No. 5,483,926 to Bogdahn discloses a retractable animal leash assembly including a housing suitable for being held in one hand. An unwindable leash is arranged partially coiled within the housing, a brake which is operable by the holding hand for momentarily blocking the portion of the leash located outside the housing at a desired length and a brake lock mechanism is provided for holding the brake in the blocking position. The brake lock mechanism is activated with operating levers arranged in two positions on the housing reachable by the holding hand. Thus the housing can be held in either the left or the right hand without degradation of function and the prolonged switch may be easily and quickly operated by the holding hand or its fingers.

U.S. Pat. No. 5,890,456 to Tancrede discloses a new retractable animal leash device for holding and storing animal waste bags therein. The inventive device includes a housing having a spaced apart pair of side panels and a circumferential wall extending between the side panels. A handle is coupled to the housing. The housing has an opening into the interior of the housing. A retractable elongate flexible leash is provided in the interior of the housing. The leash has a free end for attachment to an animal extending through the opening of the housing. Each of the side panels has a storage compartment in the interior of the housing.

U.S. Pat. No. 6,024,054 to Matt, et al. discloses a retractable leash including an integral light. The apparatus has a first housing section and a retractable leash section. The first housing section has a handle, a light connected to top front portion of the first housing section and a receiving area. A rechargeable battery is removably connected to the first housing in the handle. The retractable leash section has a second housing section pivotably mounted to the first housing section, in the receiving area, and a reel rotatably mounted to the second housing section. A leash is connected to the reel for extension and retraction relative to the first housing section. In an alternate embodiment, a light is located on the leash and electrically connected to a conductor extending along the leash.

U.S. Pat. No. 6,148,773 to Bogdahn discloses a retractable animal leash assembly including a housing suitable for being held in one hand. A freely moveable, but, if desired, lockable leash is arranged partially coiled within the housing. This housing mounts a brake key operable by the holding hand for momentarily blocking the portion of the leash located outside the holding at a desired length with a brake lock mechanism for holding the brake key in the locking position. This brake lock mechanism comprises a two-armed lever arranged to be moved between two positions on the housing reachable by the same finger/thumb of the holding hand, the handling of this pivoted lever occurring in an ergonomically optimal manner.

U.S. Pat. No. 6,474,270 to Imes discloses an improved dog leash for use with two or more dogs that enables two dogs to be walked simultaneously. The invention resists tangling and is designed to minimize the effect each dog has on each other in the natural course of the inventions use. Moreover, the invention takes into account the natural predilections of dogs in that the leash allows the dogs to roam more freely. However, the invention also accounts for the differences in the strength, size and activity of each dog attached to the invention by minimizing the effect each dog has on the other.

U.S. Pat. No. 6,648,261 to Irving discloses an extendible and retractable lead that can be extended or retracted and locked in position in a single action. The lead comprises a casing housing a reel, a lead windable about the reel, the casing having an outlet for passage of the lead and further comprising a moveable member for engagement and disengagement with the reel, a part of the moveable member being engageable with a retainer on movement of the member towards the reel to lock the member against the reel in a single action.

U.S. Pat. No. 6,712,026 to Carville, Jr. discloses a restraint-assisting handle, an animal restraint assembly, and a method of restraining an animal. The handle, assembly, and method facilitate the handling of wild and domestic animals by means of leashes. The handle, assembly, and method are amenable for use with retractable leashes, though other types of leashes may be used. Aspects of the present invention can minimize the potential for animal handlers, for example, pet owners, to be injured when using a retractable leash. One aspect of the invention is a restraint-assisting handle for use with a retractable leash having an elongated cord and a housing for storing the elongated cord. The restraint-assisting handle includes an elongated element having a channel through which the cord freely passes as the cord extends from and retracts to the housing of the retractable leash.

U.S. Pat. No. 6,792,893 to Quintero, et al. discloses a retractable leash for two animals which includes two spool assemblies for individual extension and retraction of each animal's cord. Each animal's cord is controlled by a button and locking mechanism. The cord holes where the leash cords exit are opposite of each other to minimize or prevent entanglement. If the leash cords cross, the operator need only rotate the lease handgrip to uncross the cords. In one locking design, braking and locking buttons are placed on both the top and bottom of the leash handgrip so that the operator may turn the leash and be immediately ready to control the forward movement of the animals. The leash may also be adapted to mount on the animal's collars as separate units which fasten together to form one walking leash.

U.S. Pat. No. 7,017,527 to Price discloses an integrated pet leash comprising a pet restraint, handle, retractors fastened to the outer side of the collar, and flexible elongated members. The flexible elongated members are coupled between the ends of the handle and the retractors. The retractors exert a force on the flexible elongated members toward the restraint. Additionally, the handle may include a detachable fastener to lock the collar-leash to poles, fence posts, parking meters, and the like.

U.S. Pat. No. 7,036,459 to Mugford, et al. discloses a leash assembly including a body with a handle and a cord which has an end captive in the body. The assembly is adjustable whereby the tension in the cord can be caused automatically to increase and decrease respectively causing a shudder in the cord. Optionally, a noise my accompany the change in tension in the cord. The leash will be attached in use to a collar or harness worn, for example, by a dog and the shudder is used to assist in training the animal.

U.S. Pat. No. 7,168,393 to Bogdahn, et al. discloses a leash assembly having a strap or leash that can be reeled or unreeled for walking animals. The assembly has a handle and a housing attached thereto in which the strap is arranged on a turnable roller device for being reeled or unreeled. The assembly also includes a brake key that can stop and prevent rotation of the roller device to restrict a part of the strap extending externally of the housing to a desired length. In addition, the assembly includes an exit opening through which the strap extends externally of the housing. Preferably, the exit opening is formed as a slit, and the slit has a central region along its longitudinal extension that has an enlarged opening porfion extending laterally from at least one side of the slit.

U.S. Pat. No. 7,207,296 to DiDonato discloses a two-pet no-tangle retractable leash device including an axle having a rod opening perpendicular to its axis and a first spool including a first leash and a second spool including a second leash rotatably mounted on the axle. Each leash having a proximal end attached to the spool and a distal end extending through one of two leash openings. Additionally, each spool has a spool brake and a return spring, where a proximal end of the return spring is connected to the spool and a distal end of the return spring is connected to the axle. When a force is applied to pull on the leashes, the spools rotate thereby unwinding the return springs. When the force is removed, the return springs rewind forcing the spool to rewind the leash to its original position. The device further includes a shaft having a proximal and a distal ends, the shaft being positioned perpendicular to the axle; a brake rod having a distal end passing through the rod opening and the proximal end passing through the shaft; a cone disk brake connected to the distal end of the brake rod; and a brake spring positioned on the brake rod between the disk cone brake and the axle, wherein the shaft rotation around the shaft axis and the spools' rotation around the axle axis is enabled when the brake is not engaged and disabled when the brake is engaged.

Although the aforementioned prior art have contributed to the development of the art of animal control leashes, none of these prior art patents have solved the needs of this art.

Therefore, it is an object of the present invention to provide an improved leash apparatus for use with multiple animals.

Another object of this invention is to provide an improved apparatus for eliminating the twisting of the plurality of leash lines.

Another object of this invention is to provide an improved apparatus that is simple for the operator to use.

Another object of this invention is to provide an improved apparatus that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to a leash for coupling a first animal and a second animal to an object. The leash comprises an exterior bulbous body extending between a rear end and a front end and defines a first bulbous chamber. An interior bulbous body extends between a rear end and a front end and defines a second bulbous chamber. A first tether spool rotatably engages within the second bulbous chamber. A second tether spool rotatably engages within the second bulbous chamber. A first tether coils about the first tether spool for defining a first length of the first tether upon rotating of the first tether spool. A second tether coils about the second tether spool for defining a second length of the second tether upon rotating of the second tether spool. The exterior bulbous body defines a first body volume. The interior bulbous body defines a second body volume. The first body volume is greater than the second body volume for positioning the interior bulbous body within the first bulbous chamber of the exterior bulbous body. A sleeve is interposed between the interior bulbous body and the exterior bulbous body for rotatably engaging the interior bulbous body relative to the exterior bulbous body. A first conduit traverses the interior bulbous body and the exterior bulbous body for receiving the first tether and coupling with the first animal. A second conduit traverses the interior bulbous body and the exterior bulbous body for receiving the second tether and coupling with the second animal. A clockwise rotation of the interior bulbous body relative to the exterior bulbous body upon a clockwise traversing of the first tether relative to the second tether prevents the first tether entangling with the second tether. A counter-clockwise rotation of the interior bulbous body relative to the exterior bulbous body upon a counter-clockwise traversing of the first tether relative to the second tether prevents the first tether entangling with the second tether.

In a more specific embodiment of the invention, a first spool rod is secured to the interior bulbous body and traverses the first spool for rotatably engaging the first spool within the second bulbous chamber independently from the second spool. A second spool rod is secured to the interior bulbous body and traverses the second spool for rotatably engaging the second spool within the second bulbous chamber independently from the first spool. The first spool rod and the second spool rod have an aligning orientation for positioning the first spool and second spool in an parallel orientation. A first coil spring extends between the interior bulbous body and the first spool for retracting the first tether within the interior bulbous body. A second coil spring extends between the interior bulbous body and the second spool for retracting the second tether within the interior bulbous body.

In one embodiment of the invention, the sleeve includes a rear rod receiver secured to the rear end of the exterior bulbous body. The sleeve further includes a front interior sleeve secured to the front end of the interior bulbous body. A bulbous body rod traverses the interior bulbous body and engaging between the rear rod receiver and the front interior sleeve for rotatably engaging the interior bulbous body relative to the exterior bulbous body. The first spool includes a first spool brake surface. The second spool includes a second spool brake surface. A brake plunger slidably engages around the bulbous body rod. The brake plunger includes a first plunger brake surface and a second plunger brake surface. The first plunger brake surface contacts the first spool brake surface upon sliding the brake plunger towards the first spool for defining a first spool brake. The second plunger brake surface contacts the second spool brake surface upon sliding the brake plunger towards the second spool for defining a second spool brake. A plunger spring engages between the brake plunger and the interior bulbous body for distancing the first plunger brake surface and the second plunger brake surface from the first spool brake surface and second spool brake surface respectively. A plunger actuator slidably engages the rear end of the exterior bulbous body for applying a compressive force upon the brake plunger to overcome the plunger spring and slide the brake plunger towards the first spool and the second spool while permitting the interior bulbous body to rotate relative to the exterior bulbous body.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 4 is a side view of FIG. 3;

FIG. 5 is a top view of FIG. 3;

Similar reference characters refer to similar parts throughout the several Figures of the drawings.

DETAILED DISCUSSION

Figure 1A:
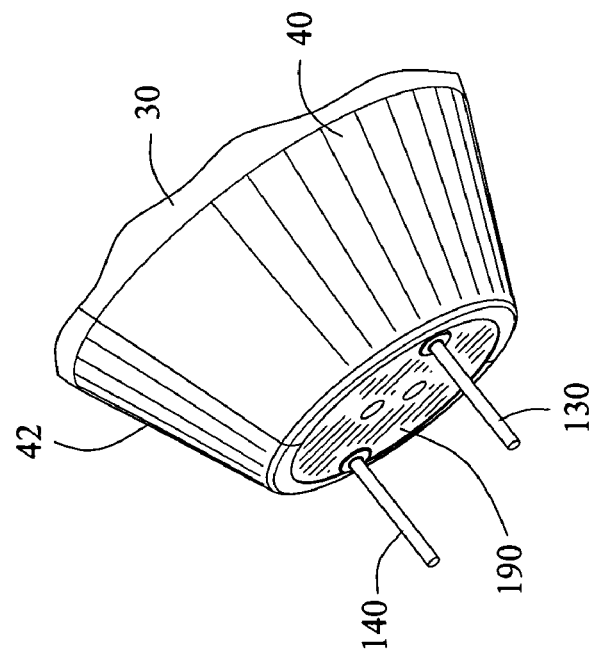
FIG. 1A is an enlarged portion of FIG. 1.
Figure 1:
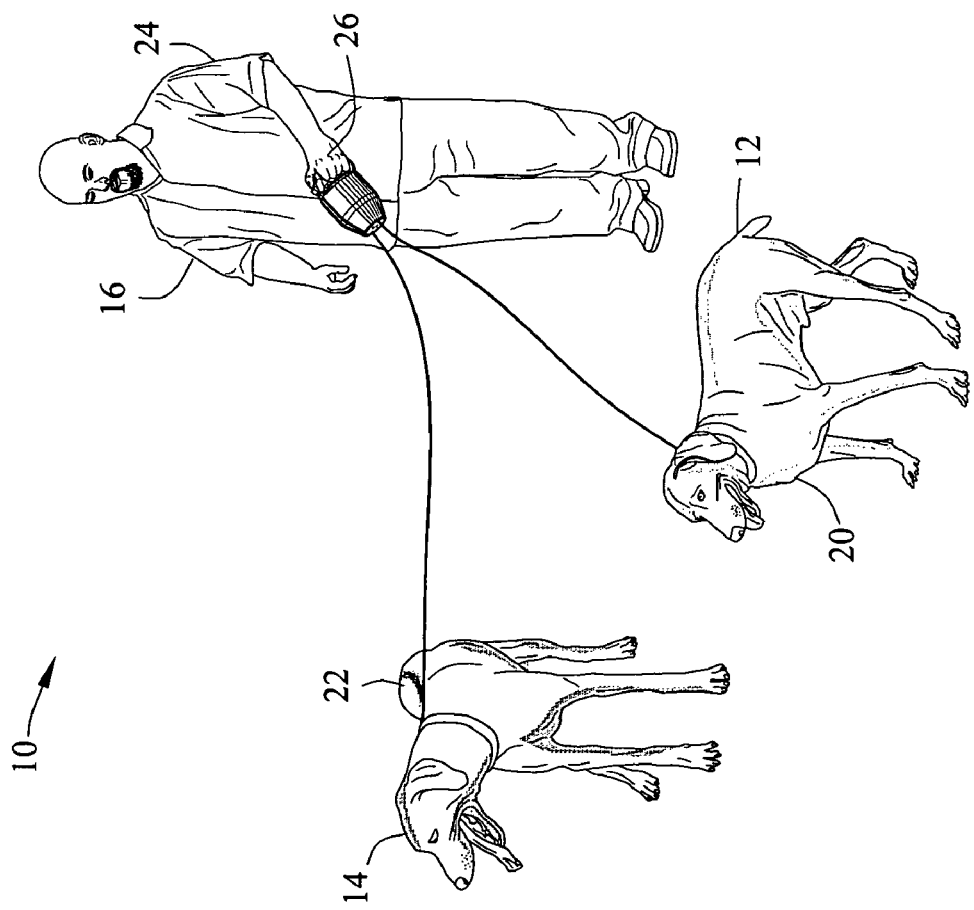
FIG. 1 is an isometric view of a leash for coupling a first animal and a second animal to an object incorporating the present invention.
Figures 2, 2A:
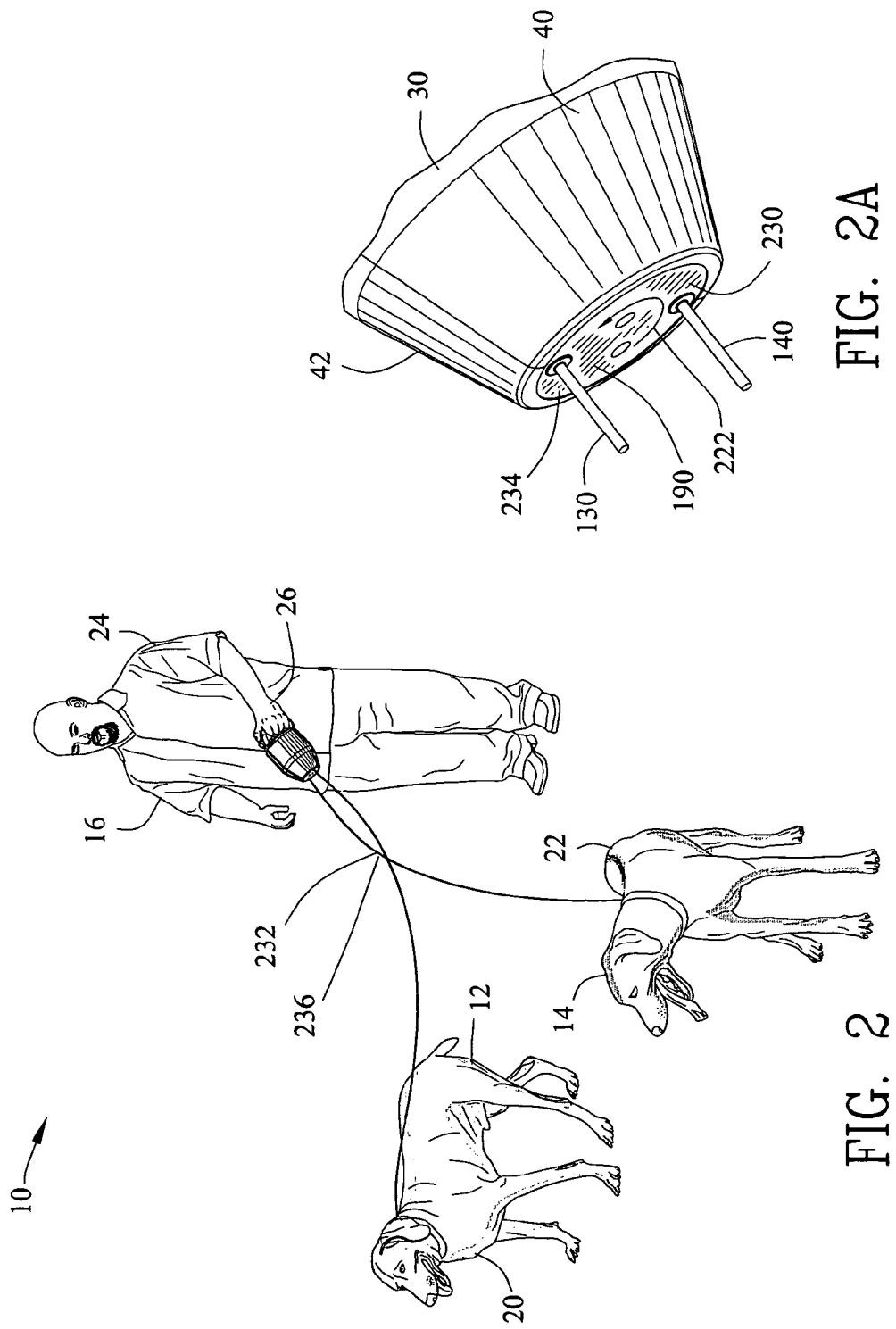
FIG. 2 is a view similar to FIG. 1 illustrating the first animal crossing paths with the second animal resulting in a first tether traversing a second tether.
FIG. 2A is a view similar to FIG. 1A illustrating an interior bulbous body rotating relative to the leash.
Figure 3:
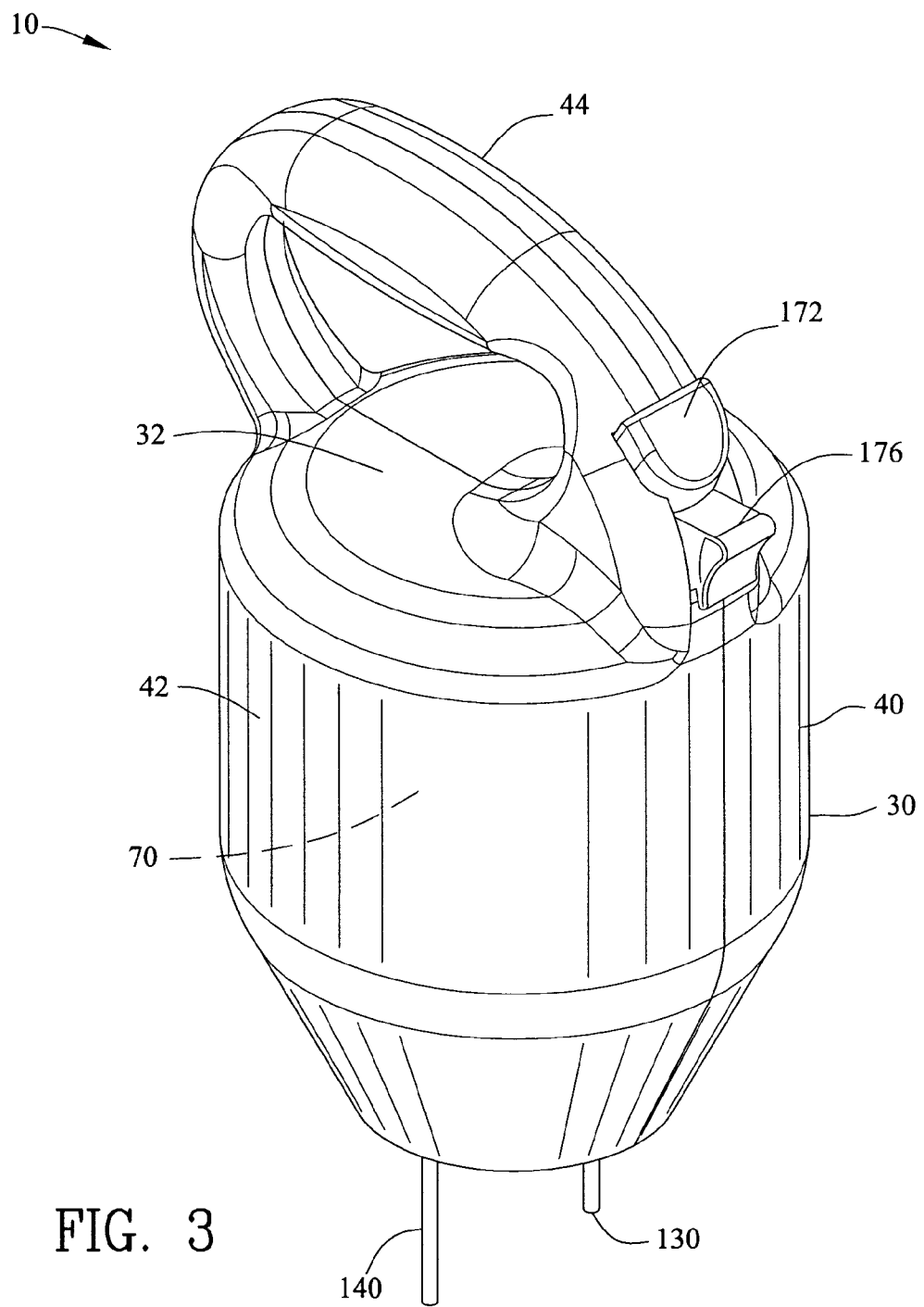
FIG. 3 is a rear isometric view of the leash.
Figure 6:
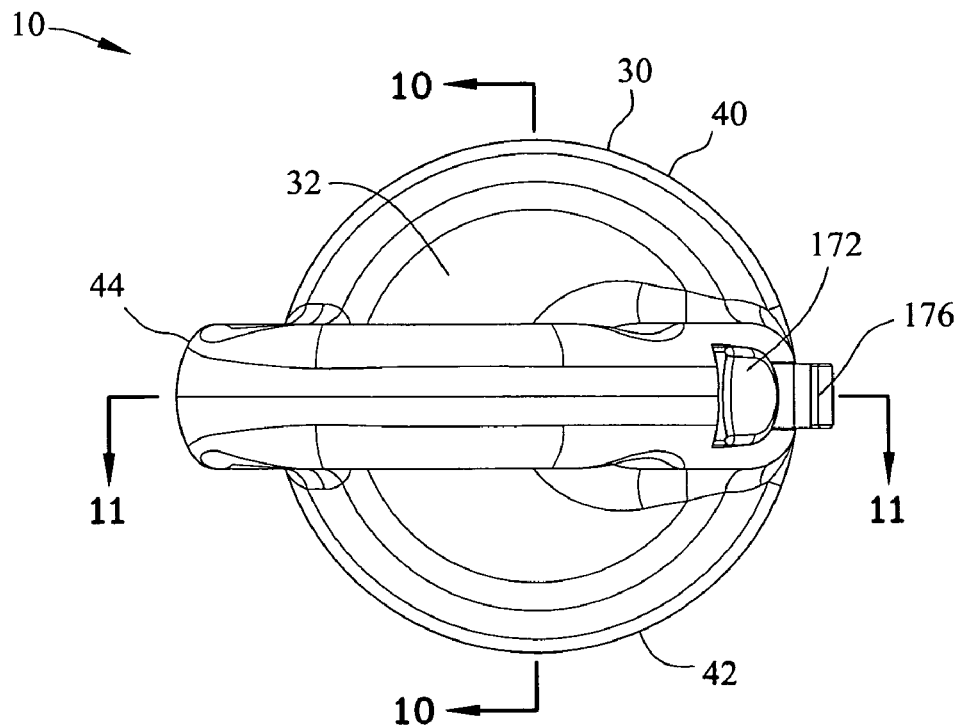
FIG. 6 is a rear view of FIG. 3.
Figure 7:
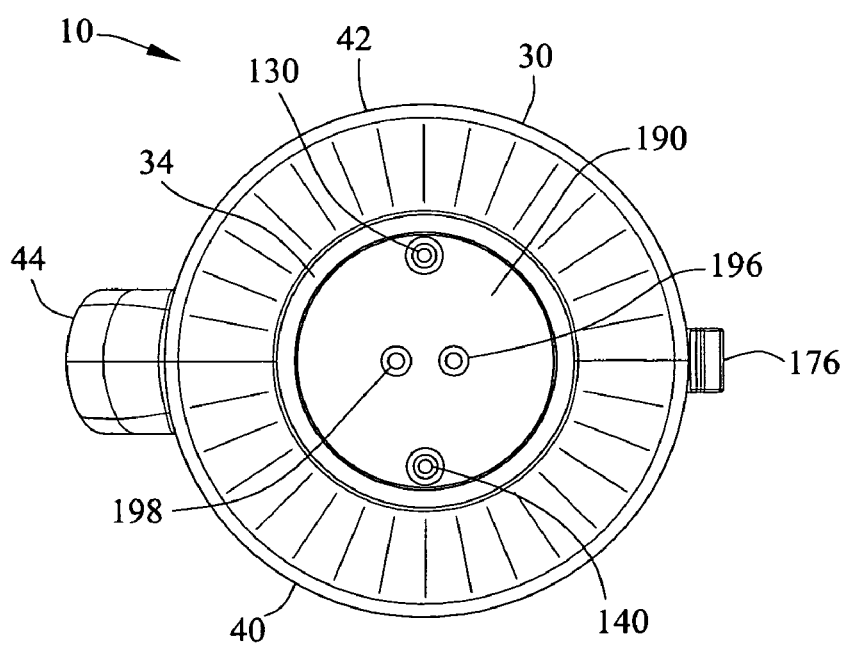
FIG. 7 is a front view of FIG. 3.
Figure 8:
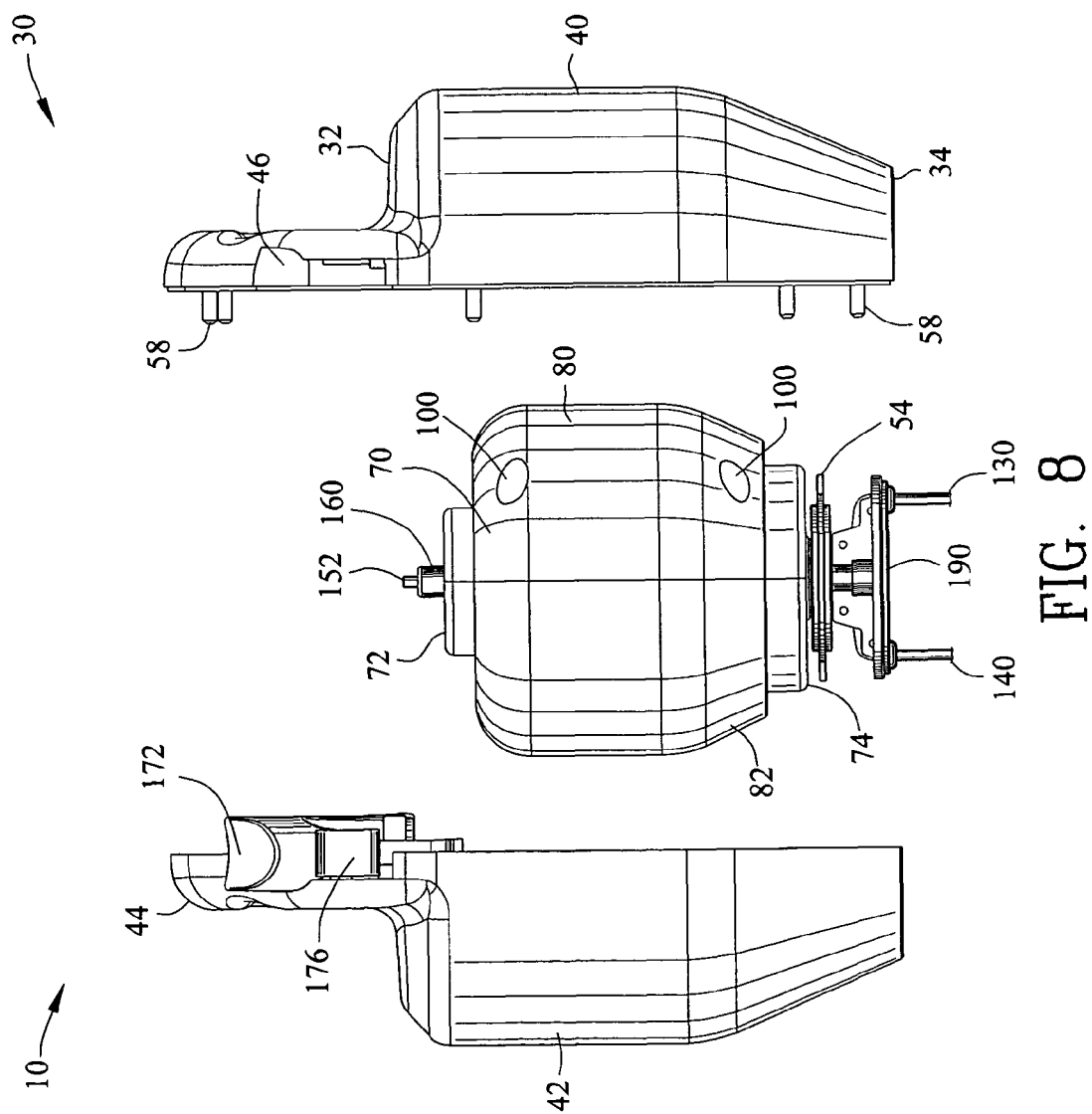
FIG. 8 is a first exploded view of FIG. 5.
Figure 9:
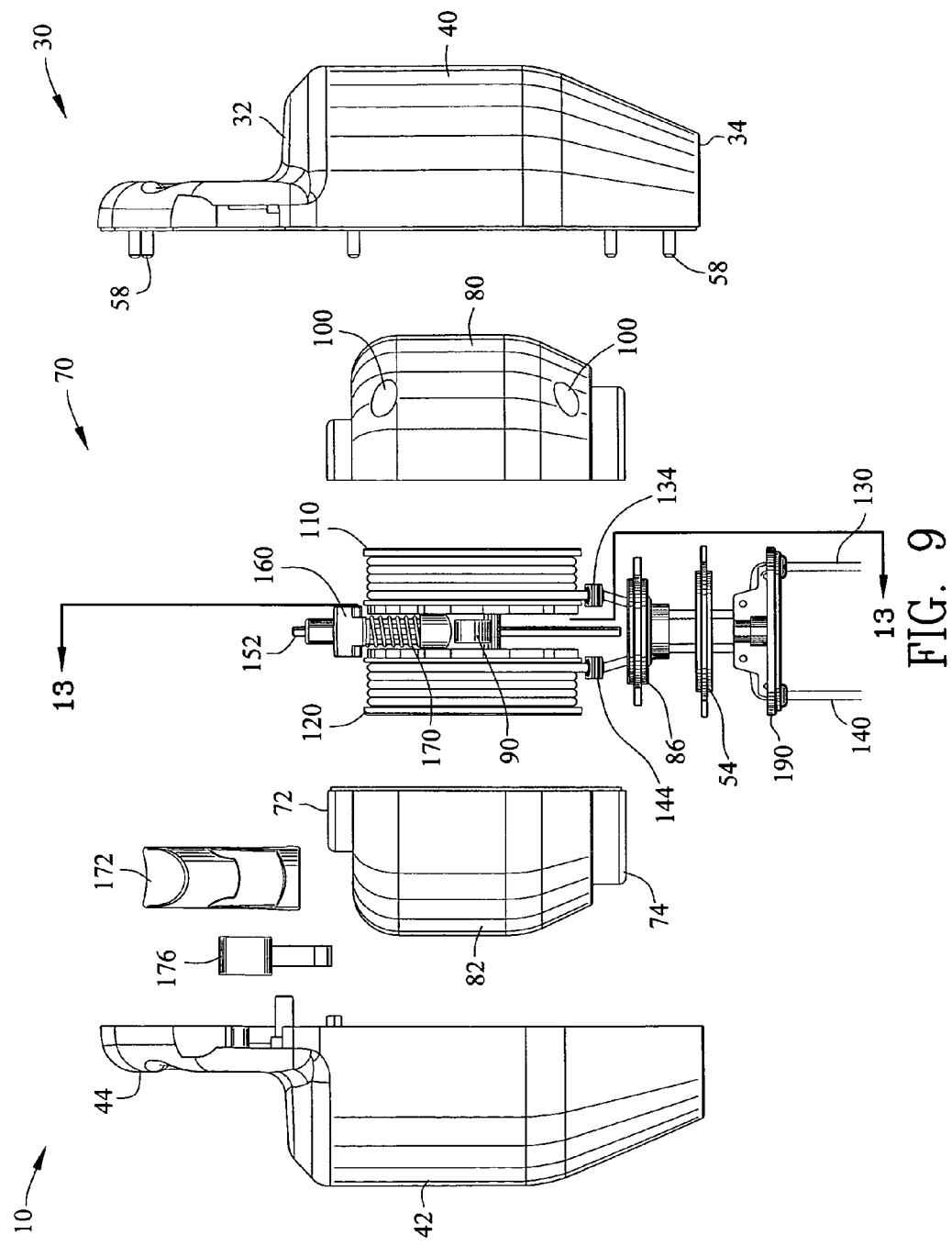
FIG. 9 is a second exploded view of FIG. 5.
Figure 10:
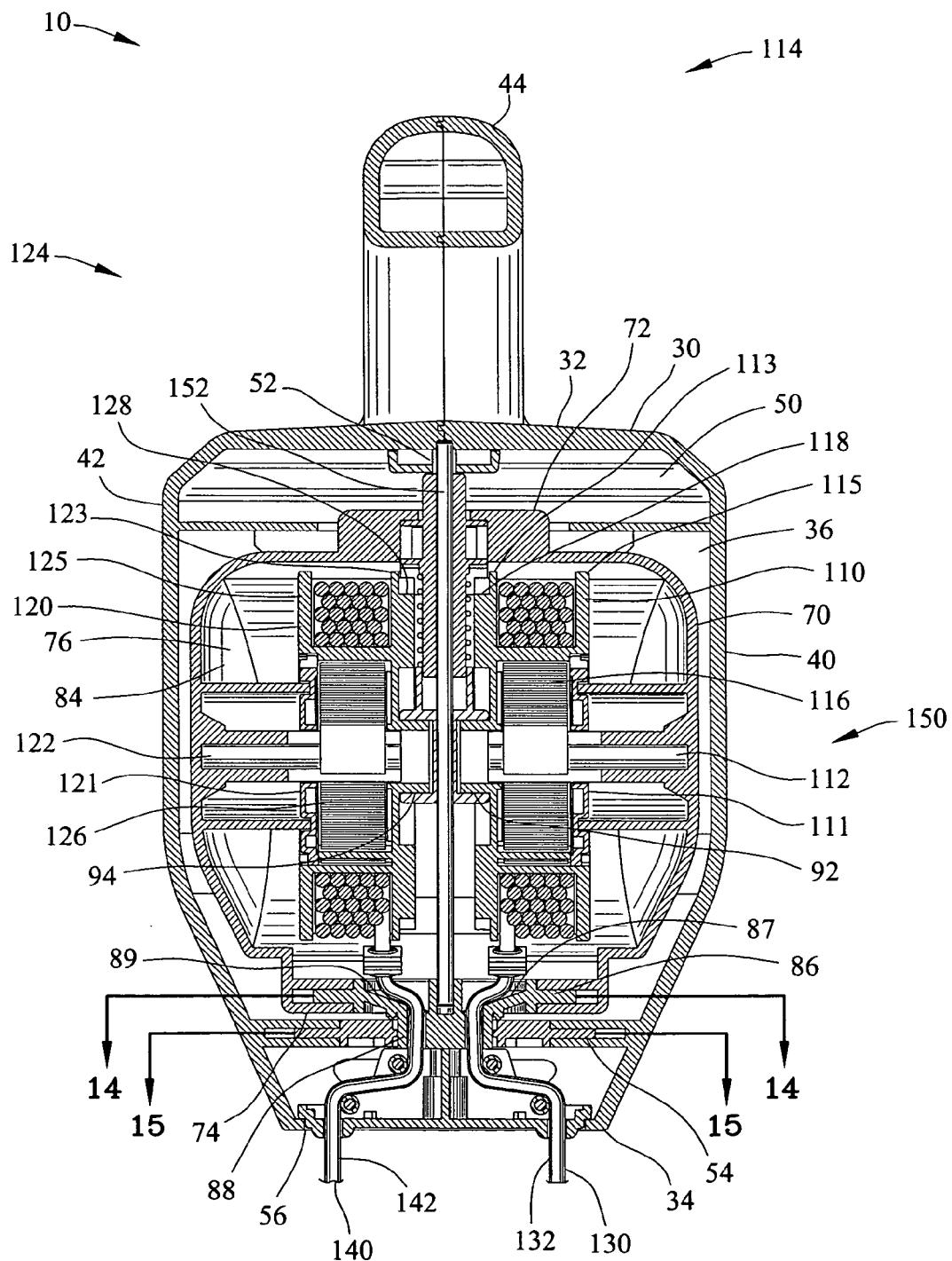
FIG. 10 is a sectional view along line 10-10 in FIG. 6 illustrating an interior bulbous body.
Figure 11:
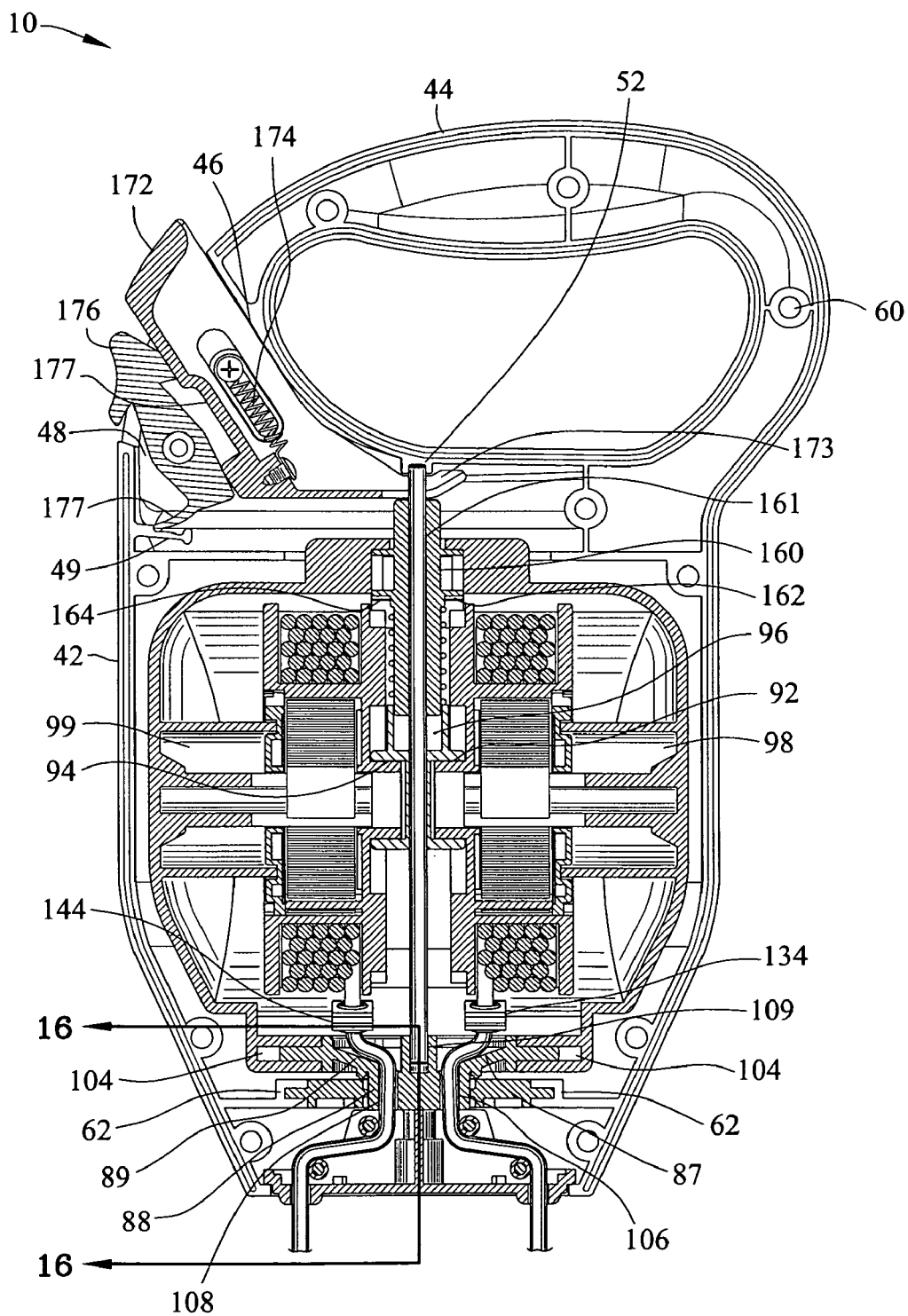
FIG. 11 is a sectional view along line 11-11 in FIG. 6 with the interior bulbous body being rotated ninety (90) degrees as shown in FIG. 10.
Figure 12:
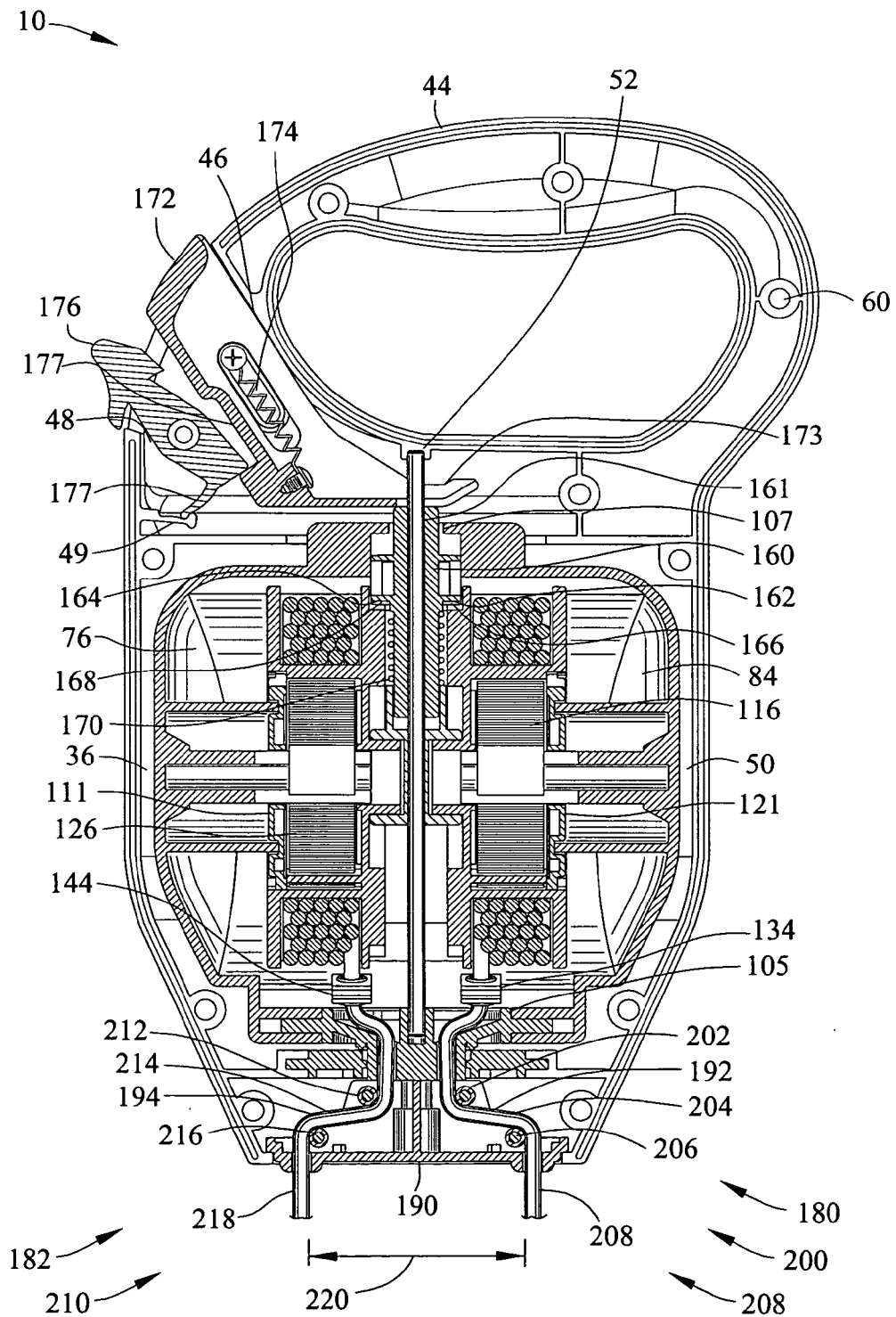
FIG. 12 is a view similar to FIG. 11 illustrating a brake plunger engaging a first tether spool and a second tether spool.
Figure 13:
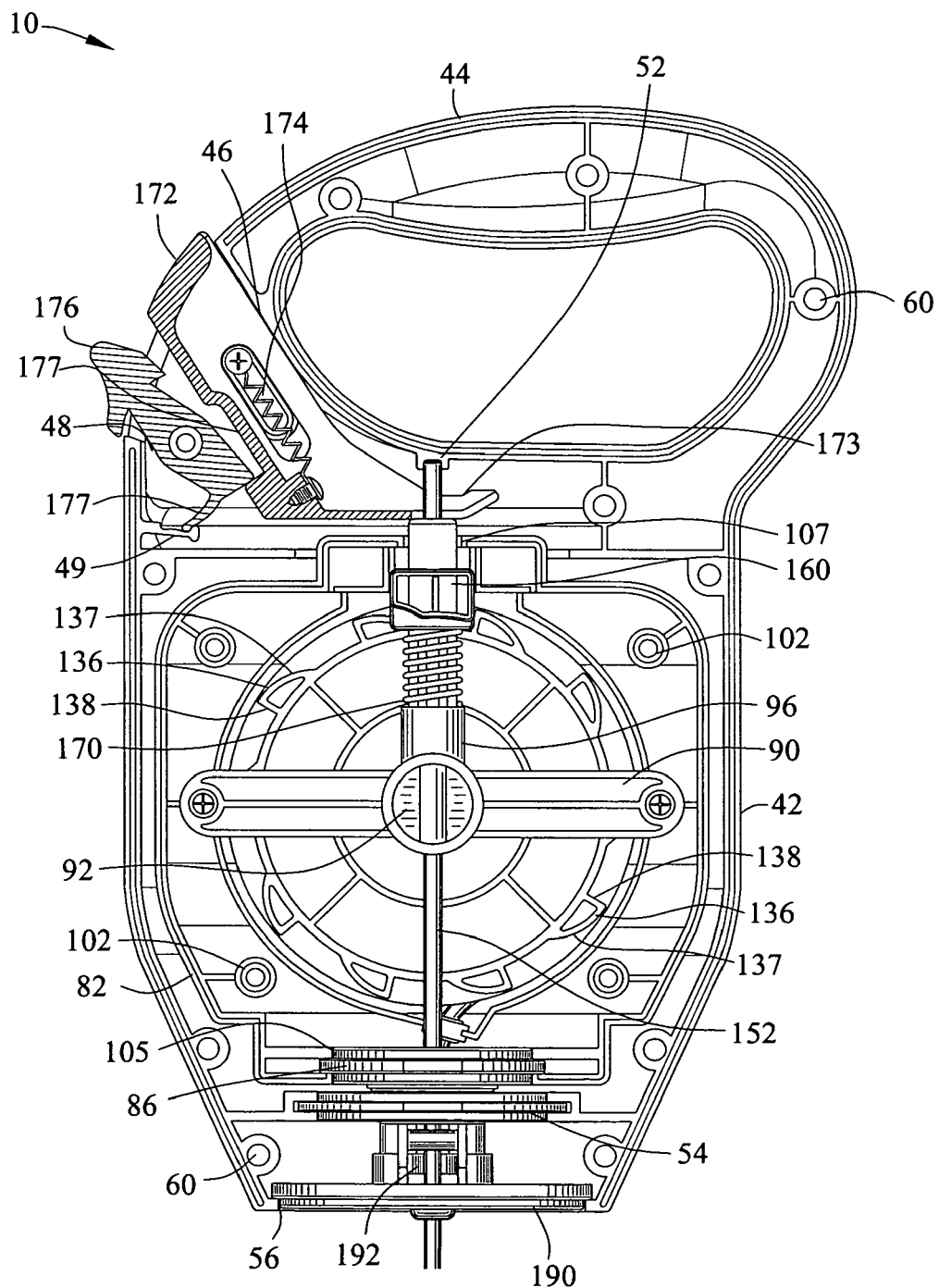
FIG. 13 is a sectional view along line 13-13 in FIG. 9.
Figure 14:
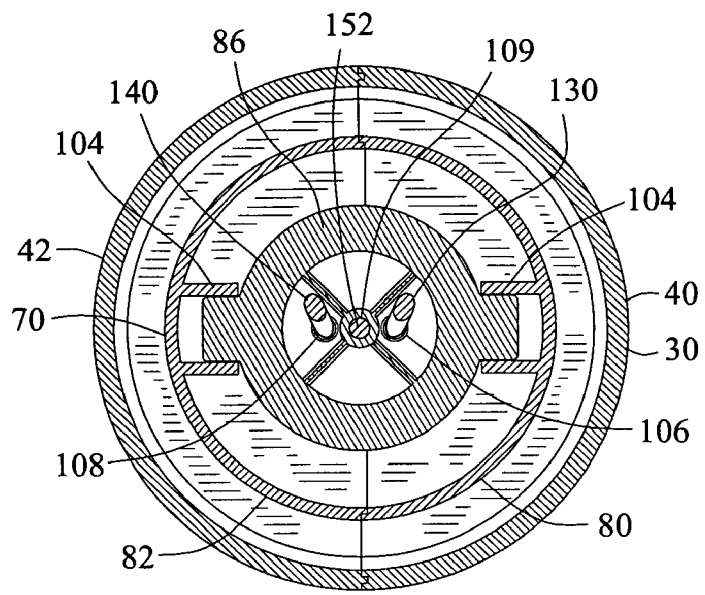
FIG. 14 is a sectional view along line 14-14 in FIG. 10.
Figure 15:
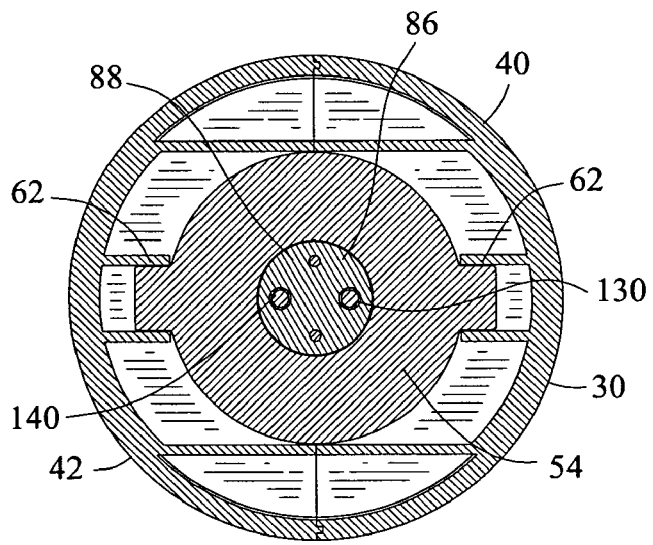
FIG. 15 is a sectional view along line 15-15 in FIG. 10.

FIGS. 1-16 are various views of a leash 10 for coupling a first animal 12 and a second animal 14 to an object 16. As shown in FIGS. 1-2A, the first animal 12 and second animal 14 may include a first dog 20 and second dog 22 respectively. The object 16 may include an individual 24 having a hand 26 to grasp the leash 10.

The leash 10 comprises an exterior bulbous body 30 extending between a rear end 32 and a front end 34 and defines a first bulbous chamber 36. The rear end 32 of the exterior bulbous body 30 includes a handle 44 for engaging the hand 26 of the individual. The exterior bulbous body 30 may be constructed from a first half 40 and a second half 42 that are coupled by a plurality of exterior mounting pins 58 engaging within a plurality of exterior pin receivers 60. The rear end 32 includes a plunger actuator channel 46 for slidably receiving a plunger actuator 172, a plunger lock channel 48 for pivotably receiving an actuator lock 176 and a lock tab 49 for engaging the actuator lock 176. The exterior bulbous body 30 may include a front exterior sleeve mount 62 for receiving a front exterior sleeve 54. The exterior bulbous body 30 may be constructed from a polymeric material or other rigid materials.

An interior bulbous body 70 extends between a rear end 72 and a front end 74 and defines a second bulbous chamber 76. The interior bulbous body 70 may be constructed from a first half 80 and a second half 82 that are coupled by a plurality of interior mounting pins 100 engaging within a plurality of interior pin receivers 102. The first half 80 may include a first spool stabilizing socket 98 and the second half 82 may include a second spool stabilizing socket 99. The front end 74 includes an interior front sleeve aperture 105 and the rear end 72 including an interior rear bar aperture 107. The front end 74 further includes a front interior sleeve mount 104 for receiving a front interior sleeve 86. The interior bulbous body 70 may be constructed from a polymeric material or other rigid materials.

The exterior bulbous body 30 defines a first body volume 50. The interior bulbous body 70 defines a second body volume 84. The first body volume 50 is greater than the second body volume 84 for positioning the interior bulbous body 70 within the first bulbous chamber 36 of the exterior bulbous body 30.

A sleeve 150 is interposed between the interior bulbous body 70 and the exterior bulbous body 30 for rotatably engaging the interior bulbous body 70 relative to the exterior bulbous body 30. The sleeve 150 may include the rear rod receiver 52 secured to the rear end 32 of the exterior bulbous body 30. The sleeve 150 may further include the front interior sleeve 86 secured to the front end 74 of the interior bulbous body 70. The front interior sleeve 86 has a front rod receiver 109. The sleeve 159 also may include the front exterior sleeve 54 secured to the exterior bulbous body 30. The front interior sleeve 86 includes a sleeve cylindrical portion 88 for rotatably engaging within the front exterior sleeve 54. The front interior sleeve 86 may further include a first sleeve taper 87 and second sleeve taper 89 for diverting a first tether 130 and a second tether 140. A bulbous body rod 152 traverses the interior bulbous body 70 and engaging between the rear rod receiver 52 and the front rod receiver 109 for rotatably engaging the interior bulbous body 70 relative to the exterior bulbous body 30.

A first tether spool 110 rotatably engages within the second bulbous chamber 76. The first tether spool 110 includes a first spool base 111, a primary flange 113 and a secondary flange 115. A first spool rod 112 extends between the first spool stabilizing socket 98 and the first spool rod socket 92 and through the first spool 110 for rotatably engaging the first spool 110 within the second bulbous chamber 76 independently from a second spool 120. A first tether 130 coils about the first tether spool 110 for defining a first length 132 of the first tether 130 upon rotating of the first tether spool 110. A first coil spring 116 engages between the first tether spool 110 and the interior bulbous body 70 for rotating the first tether spool 110 such that the first tether 130 is coiled around the first tether spool 110 and retracted into the interior bulbous body 70.

The second tether spool 120 rotatably engages within the second bulbous chamber 76. The second tether spool 120 includes a second spool base 121, a primary flange 123 and a secondary flange 125. A second spool rod 122 extends between the second spool stabilizing socket 99 and the second spool rod socket 94 and through the second tether spool 120 for rotatably engaging the second spool 120 within the second bulbous chamber 76 independently from a first tether spool 110. The second tether 140 coils about the second tether spool 120 for defining a second length 142 of the second tether 140 upon rotating of the second tether spool 120. A second coil spring 126 engages between the second tether spool 120 and the interior bulbous body 70 for rotating the second tether spool 120 such that the second tether 140 is coiled around the second tether spool 120 and retracted into the interior bulbous body 70. The first spool rod 112 and the second spool rod 122 have an aligning orientation 114 for positioning the first spool 110 and second spool 120 in a parallel orientation 124. A first coil guide 134 may be secured adjacent to the first tether spool 110 for receiving the first tether 130. The first coil guide 134 maintains the first tether 130 on the first tether spool 110. Similarly, a second coil guide 144 may be secured adjacent to the second tether spool 120 for receiving the second tether 140. The second coil guide 144 maintains the second tether 140 on the second tether spool 120.

The first spool 110 includes a first spool brake surface 118. The second spool 120 includes a second spool brake surface 128. The first spool brake surface 118 and the second spool brake surface 128 may include a plurality of brake tabs 136. The brake tabs 136 include a brake taper surface 137 and a brake stop surface 138.

A brake plunger 160 having a plunger bore 161 slidably engages around the bulbous body rod 152. The brake plunger 160 includes a first plunger brake surface 162 and a second plunger brake surface 164. The first plunger brake surface 162 contacts the first spool brake surface 118 upon sliding the brake plunger 160 towards the first spool 110 for defining a first spool brake 166. The second plunger brake surface 164 contacts the second spool brake surface 128 upon sliding the brake plunger 160 towards the second spool 120 for defining a second spool brake 168. A plunger spring 170 engages between the brake plunger 160 and the interior bulbous body 70 for distancing the first plunger brake surface 162 and the second plunger brake surface 164 from the first spool brake surface 118 and second spool brake surface 128 respectively.

A plunger actuator 172 slidably engages a plunger actuator channel 46 in the rear end 32 of the exterior bulbous body 30 for applying a compressive force upon the brake plunger 160 to overcome the plunger spring 170 and slide the brake plunger 160 towards the first spool 110 and the second spool 120 while permitting the interior bulbous body 70 to rotate relative to the exterior bulbous body 30. The plunder actuator 172 includes an actuator arm 173 that slidably engaging around the bulbous body rod 152. Upon a compressive force applied to the plunger actuator 172, the actuator arm 173 is depressed against the brake plunger 160. If the compressive force applied to the plunger actuator 172 is removed, an actuator return spring 174 causes the plunger actuator 172 to disengage from the brake plunger 160.

The plunger actuator 172 may include an actuator groove 175 for engaging with an actuator lock 176. The actuator lock 176 includes an actuator lock arm 177 that abuts the lock tab 49. To the retain the plunger actuator 172 in the depressed position without the compressive force applied to the plunger actuator 172, the actuator lock 176 may be utilized wherein the actuator lock 176 prevents the plunger actuator 172 from disengaging from the brake plunger 160.

The brake taper surface 137 permits rotation of the first tether spool 110 and the second tether spool 120 for retracting the first tether 130 and the second tether 140 into the interior bulbous body 70 even during engagement of the brake plunger 160 with the first tether spool 110 and the second tether spool 120. The brake stop surface 138 prohibits rotation of the first tether spool 110 and the second tether spool 120 for extending the first tether 130 and the second tether 140 from the interior bulbous body 70 during engagement of the brake plunger 160 with the first tether spool 110 and the second tether spool 120.

A first conduit 180 traverses the interior bulbous body 70, the exterior bulbous body 30 and a pulley manifold 190 secured to the front end 74 of the interior bulbous body 70. The first conduit 180 receives the first tether 130 that couples with the first animal 12. More specifically, the first conduit 180 includes a first interior tether aperture 106 in the front interior sleeve 86, the front exterior aperture 56 in the front end 34 of the exterior bulbous body 30 and a primary tether pulley 200 secured to the front interior sleeve 86.

A second conduit 182 traverses the interior bulbous body 70, the exterior bulbous body 30 and the pulley manifold 190 secured to the front end 74 of the interior bulbous body 70. The second conduit 182 receives the second tether 140 that couples with the second animal 14. More specifically, the second conduit 182 includes a second interior tether aperture 108 in the front interior sleeve 86, a front exterior aperture 56 in the front end 34 of the exterior bulbous body 30 and a secondary tether pulley 210 secured to the front interior sleeve 86.

Figure 16:
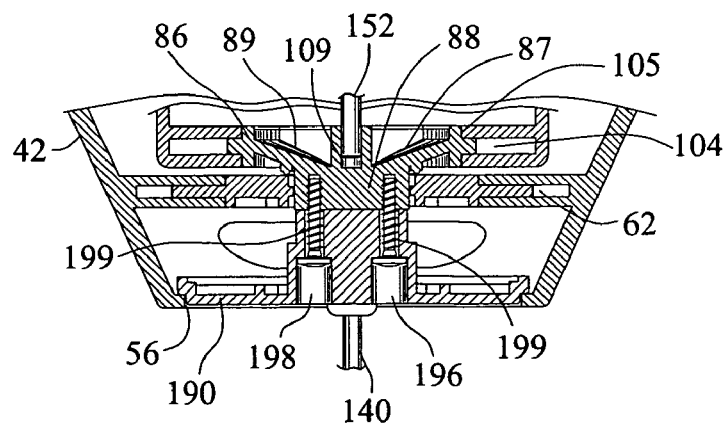
FIG. 16 is a sectional view along line 16-16 in FIG. 11.

As best seen in FIG. 16, the front interior sleeve 86 includes a first screw aperture 196 and a second screw aperture 198. Screws 199 traverse the first screw aperture 196 and the second screw aperture 198 and fasten into the front interior sleeve 86 for securing the pulley manifold 190 to the front interior sleeve 86.

The primary tether pulley 200 includes a first roller 202 and a second roller 206 positioned within a first pulley channel 192. The first roller 202 positions the first tether 130 in a generally parallel orientation 214 relative to the front exterior aperture 56. The second roller 206 positions the first tether 130 in a generally perpendicular 208 orientation relative to the front exterior aperture 56. The secondary tether pulley 210 includes a third roller 212 and a fourth roller 216 within a second pulley channel 194. The third roller 212 positions the second tether 140 in a generally parallel orientation 214 relative to the front exterior aperture 56. The fourth roller 216 positions the second tether 140 in a generally perpendicular 218 orientation relative to the front exterior aperture 56. The primary tether pulley 200 and the secondary tether pulley 210 create a tether distance 220 between the first tether 130 and second tether 140 within the front exterior aperture 56 for increasing a moment force 222 upon the interior bulbous body 70 for rotating the interior bulbous body 70 relative to the exterior bulbous body 30.

A clockwise rotation 230 of the interior bulbous body 70 relative to the exterior bulbous body 30 occurs upon a clockwise traversing 232 of the first tether 130 relative to the second tether 140 for preventing the first tether 130 entangling with the second tether 140. A counter-clockwise rotation 234 of the interior bulbous body 70 relative to the exterior bulbous body 30 occurs upon a counter-clockwise traversing 236 of the first tether 130 relative to the second tether 140 for preventing the first tether 130 entangling with the second tether 140.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A leash for coupling a first animal and a second animal to an object, the leash comprising;
    an exterior bulbous body extending between a rear end and a front end and defining a first bulbous chamber
    an interior bulbous body extending between a rear end and a front end and defining a second bulbous chamber;
    a first tether spool rotatably engaging within said second bulbous chamber;
    a second tether spool rotatably engaging within said second bulbous chamber;
    a first tether coiling about said first tether spool for defining a first length of said first tether upon rotating of said first tether spool;
    a second tether coiling about said second tether spool for defining a second length of said second tether upon rotating of said second tether spool;
    said exterior bulbous body defining a first body volume;
    said interior bulbous body defining a second body volume;
    said first body volume being greater than said second body volume for positioning said interior bulbous body within said first bulbous chamber of said exterior bulbous body;
    a sleeve interposed between said interior bulbous body and said exterior bulbous body for rotatably engaging said interior bulbous body relative to said exterior bulbous body;
    a first conduit traversing said interior bulbous body and said exterior bulbous body for receiving said first tether and coupling with the first animal;
    a second conduit traversing said interior bulbous body and said exterior bulbous body for receiving said second tether and coupling with the second animal;
    a clockwise rotation of said interior bulbous body relative to said exterior bulbous body upon a clockwise traversing of said first tether relative to said second tether for preventing said first tether entangling with said second tether; and
    a counter-clockwise rotation of said interior bulbous body relative to said exterior bulbous body upon a counter-clockwise traversing of said first tether relative to said second tether for preventing said first tether entangling with said second tether.

2. A leash for coupling a first animal and a second animal to an object as set forth in claim 1, wherein said rear end of said exterior bulbous body including a handle for coupling to the object.

3. A leash for coupling a first animal and a second animal to an object as set forth in claim 1, wherein said sleeve including a rear rod receiver secured to said rear end of said exterior bulbous body;
    said sleeve including a front interior sleeve secured to said front end of said interior bulbous body; and
    a bulbous body rod traversing said interior bulbous body and engaging between said rear rod receiver and said front interior sleeve for rotatably engaging said interior bulbous body relative to said exterior bulbous body.

4. A leash for coupling a first animal and a second animal to an object as set forth in claim 1, wherein said sleeve including a rear rod receiver secured to said rear end of said exterior bulbous body;
    said sleeve including a front interior sleeve secured to said front end of said interior bulbous body;
    said sleeve including a front exterior sleeve secured to said front end of said exterior bulbous body;
    said interior sleeve including a sleeve cylindrical portion for rotatably engaging within said front exterior sleeve; and
    a bulbous body rod traversing said interior bulbous body and engaging between said rear rod receiver and said front interior sleeve for rotatably engaging said interior bulbous body relative to said exterior bulbous body.

5. A leash for coupling a first animal and a second animal to an object as set forth in claim 1, further including a first spool rod secured to said interior bulbous body and traversing said first spool for rotatably engaging said first spool within said second bulbous chamber;
    a second spool rod secured to said interior bulbous body and traversing said second spool for rotatably engaging said second spool within said second bulbous chamber; and
    said first spool rod and said second spool rod having an aligning orientation for positioning said first spool and second spool in an parallel orientation.

6. A leash for coupling a first animal and a second animal to an object as set forth in claim 1, further including a first spool rod secured to said interior bulbous body and traversing said first spool for rotatably engaging said first spool within said second bulbous chamber independently from said second spool;
    a second spool rod secured to said interior bulbous body and traversing said second spool for rotatably engaging said second spool within said second bulbous chamber independently from said first spool;
    said first spool rod and said second spool rod having an aligning orientation for positioning said first spool and second spool in an parallel orientation;
    a first coil spring extending between said interior bulbous body and said first spool for retracting said first tether within said interior bulbous body; and
    a second coil spring extending between said interior bulbous body and said second spool for retracting said second tether within said interior bulbous body.

7. A leash for coupling a first animal and a second animal to an object as set forth in claim 1, wherein said sleeve including a rear rod receiver secured to said rear end of said exterior bulbous body;
    said sleeve including a front interior sleeve secured to said front end of said interior bulbous body;

a bulbous body rod traversing said interior bulbous body and engaging between said rear rod receiver and said front interior sleeve for rotatably engaging said interior bulbous body relative to said exterior bulbous body;

said first spool including a first spool brake surface;

said second spool including a second spool brake surface;

a brake plunger slidably engaging said bulbous body rod;

said brake plunger including a first plunger brake surface;

said brake plunger including a second plunger brake surface;

said first plunger brake surface contacting said first spool brake surface upon sliding said brake plunger towards said first spool for defining a first spool brake;

said second plunger brake surface contacting said second spool brake surface upon sliding said brake plunger towards said second spool for defining a second spool brake; and a plunger spring engaging between said brake plunger and said interior bulbous body for distancing said first plunger brake surface and said second plunger brake surface from said first spool brake surface and second spool brake surface respectively.

8. A leash for coupling a first animal and a second animal to an object as set forth in claim 1, wherein said sleeve including a rear rod receiver secured to said rear end of said exterior bulbous body;

said sleeve including a front interior sleeve secured to said front end of said interior bulbous body;

a bulbous body rod traversing said interior bulbous body and engaging between said rear rod receiver and said front interior sleeve for rotatably engaging said interior bulbous body relative to said exterior bulbous body;

said first spool including a first spool brake surface;

said second spool including a second spool brake surface;

a brake plunger slidably engaging said bulbous body rod;

said brake plunger including a first plunger brake surface;

said brake plunger including a second plunger brake surface;

said first plunger brake surface contacting said first spool brake surface upon sliding said brake plunger towards said first spool for defining a first spool brake;

said second plunger brake surface contacting said second spool brake surface upon sliding said brake plunger towards said second spool for defining a second spool brake;

a plunger spring engaging between said brake plunger and said interior bulbous body for distancing said first plunger brake surface and said second plunger brake surface from said first spool brake surface and second spool brake surface respectively; and a plunger actuator slidably engaging said rear end of said exterior bulbous body for applying a compressive force upon said brake plunger to overcome said plunger spring and sliding said brake plunger towards said first spool and said second spool while permitting said interior bulbous body to rotate relative to said exterior bulbous body.

9. A leash for coupling a first animal and a second animal to an object as set forth in claim 1, wherein said first conduit including a front exterior aperture in said front end of said exterior bulbous body and a primary tether pulley secured to said front end of said interior bulbous body;

said second conduit including said front exterior aperture in said front end of said exterior bulbous body and a secondary tether pulley secured to said front end of said interior bulbous body;

said primary tether pulley including a first roller for positioning said first tether generally parallel to said front exterior aperture;

said primary tether pulley including a second roller for positioning said first tether generally perpendicular to said front exterior aperture;

said secondary tether pulley including a third roller for positioning said second tether generally parallel to said front exterior aperture;

said secondary tether pulley including a fourth roller for positioning said second tether generally perpendicular to said front exterior aperture; and said primary tether pulley and said secondary tether pulley creating a tether distance between said first tether and second tether within said front exterior aperture for increasing a moment force upon said interior bulbous body for rotating said interior bulbous body relative to said exterior bulbous body.

10. A leash for coupling a first animal and a second animal to an object, the leash comprising;

an exterior bulbous body extending between a rear end and a front end and defining a first bulbous chamber an interior bulbous body extending between a rear end and a front end and defining a second bulbous chamber;

a first tether spool rotatably engaging within said second bulbous chamber;

a second tether spool rotatably engaging within said second bulbous chamber;

a first tether coiling about said first tether spool for defining a first length of said first tether upon rotating of said first tether spool;

a second tether coiling about said second tether spool for defining a second length of said second tether upon rotating of said second tether spool;

said exterior bulbous body defining a first body volume;

said interior bulbous body defining a second body volume;

said first body volume being greater than said second body volume for positioning said interior bulbous body within said first bulbous chamber of said exterior bulbous body;

a sleeve interposed between said interior bulbous body and said exterior bulbous body for rotatably engaging said interior bulbous body relative to said exterior bulbous body;

a first conduit traversing said interior bulbous body and said exterior bulbous body for receiving said first tether and coupling with the first animal;

a second conduit traversing said interior bulbous body and said exterior bulbous body for receiving said second tether and coupling with the second animal;

a clockwise rotation of said interior bulbous body relative to said exterior bulbous body upon a clockwise traversing of said first tether relative to said second tether for preventing said first tether entangling with said second tether;

a counter-clockwise rotation of said interior bulbous body relative to said exterior bulbous body upon a counter-clockwise traversing of said first tether relative to said second tether for preventing said first tether entangling with said second tether;

a first spool rod secured to said interior bulbous body and traversing said first spool for rotably engaging said first spool within said second bulbous chamber independently from said second spool;

a second spool rod secured to said interior bulbous body and traversing said second spool for rotatably engaging said second spool within said second bulbous chamber independently from said first spool;

said first spool rod and said second spool rod having an aligning orientation for positioning said first spool and second spool in an parallel orientation;

a first coil spring extending between said interior bulbous body and said first spool for retracting said first tether within said interior bulbous body; and a second coil spring extending between said interior bulbous body and said second spool for retracting said second tether within said interior bulbous body.

11. A leash for coupling a first animal and a second animal to an object, the leash comprising;

an exterior bulbous body extending between a rear end and a front end and defining a first bulbous chamber an interior bulbous body extending between a rear end and a front end and defining a second bulbous chamber;

a first tether spool rotatably engaging within said second bulbous chamber;

a second tether spool rotatably engaging within said second bulbous chamber;

a first tether coiling about said first tether spool for defining a first length of said first tether upon rotating of said first tether spool;

a second tether coiling about said second tether spool for defining a second length of said second tether upon rotating of said second tether spool;

said exterior bulbous body defining a first body volume;

said interior bulbous body defining a second body volume;

said first body volume being greater than said second body volume for positioning said interior bulbous body within said first bulbous chamber of said exterior bulbous body;

a sleeve interposed between said interior bulbous body and said exterior bulbous body for rotatably engaging said interior bulbous body relative to said exterior bulbous body;

a first conduit traversing said interior bulbous body and said exterior bulbous body for receiving said first tether and coupling with the first animal;

a second conduit traversing said interior bulbous body and said exterior bulbous body for receiving said second tether and coupling with the second animal;

a clockwise rotation of said interior bulbous body relative to said exterior bulbous body upon a clockwise traversing of said first tether relative to said second tether for preventing said first tether entangling with said second tether;

a counter-clockwise rotation of said interior bulbous body relative to said exterior bulbous body upon a counter-clockwise traversing of said first tether relative to said second tether for preventing said first tether entangling with said second tether;

said sleeve including a rear rod receiver secured to said rear end of said exterior bulbous body;

said sleeve including a front interior sleeve secured to said front end of said interior bulbous body;

a bulbous body rod traversing said interior bulbous body and engaging between said rear rod receiver and said front interior sleeve for rotatably engaging said interior bulbous body relative to said exterior bulbous body;

said first spool including a first spool brake surface;

said second spool including a second spool brake surface;

a brake plunger slidably engaging said bulbous body rod;

said brake plunger including a first plunger brake surface;

said brake plunger including a second plunger brake surface;

said first plunger brake surface contacting said first spool brake surface upon sliding said brake plunger towards said first spool for defining a first spool brake;

said second plunger brake surface contacting said second spool brake surface upon sliding said brake plunger towards said second spool for defining a second spool brake; and a plunger spring engaging between said brake plunger and said interior bulbous body for distancing said first plunger brake surface and said second plunger brake surface from said first spool brake surface and second spool brake surface respectively.

* * * * *